July 8, 1958  H. WESTERDAHL  2,841,816
FISH FILLETING MACHINE
Filed March 5, 1954  3 Sheets-Sheet 3

INVENTOR.
Henry Westerdahl
BY Michael S. Striker
agt.

United States Patent Office 2,841,816
Patented July 8, 1958

2,841,816

FISH FILLETING MACHINE

Henry Westerdahl, Sydhavnen, Ronne, Denmark, assignor to A/S Atlas, Copenhagen, Denmark Application March 5, 1954, Serial No. 414,402

Claims priority, application Denmark March 7, 1953

8 Claims. (Cl. 17—4)

The present invention relates to a process for cutting fillets from fish such as cod and similarly shaped species, and to a machine for carrying the process into effect.

The main object of the invention is to provide a process by means of which it is possible to cut fillets from fish in such a manner that the fillets are uniformly cut-off in relation to the size and shape of the fish.

Another object of the invention is to provide a machine by means of which the said process may be effectuated.

A further object of the invention is to provide a machine for cutting-off the fillets of a fish by first cutting the tail-end fillets, thereupon the body fillets and finally remove the fillets from each side of the fish backbone into two separate fillets each comprising the tail and body fillet parts.

A still further object of the invention is to provide a machine for cutting-off the fillets of a fish by moving the beheaded fish tail-end foremost to cutter members, arranged on each side of the fish, by means of a narrow propelling member which can move between the said cutter members, and which engages the head-end of the fish backbone throughout the cutting process.

Yet another object of the invention is to provide cutter members arranged for lateral resilient displacement in relation to variations in the cross section of the fish backbone.

Figure 1:
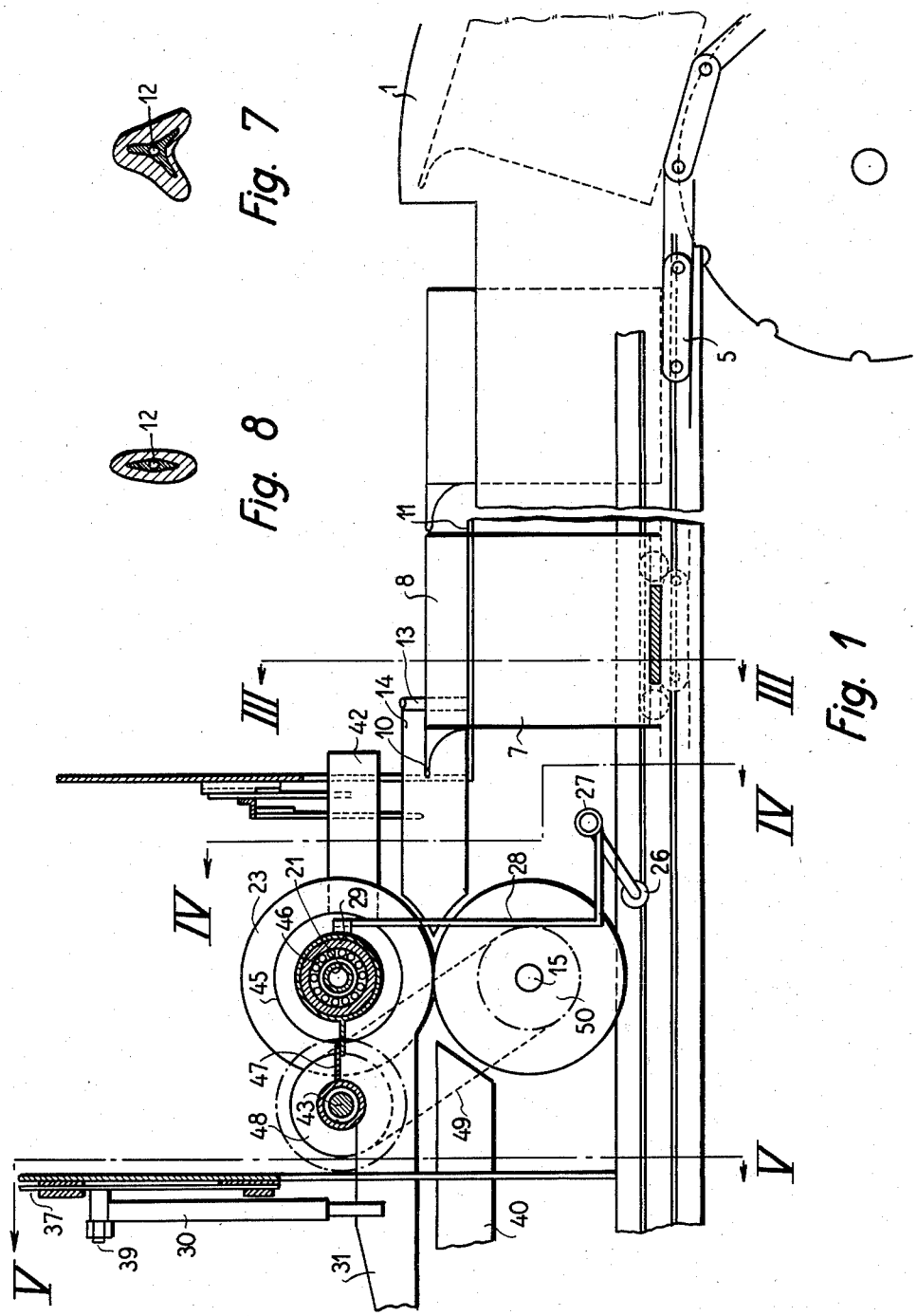
Figure 2:
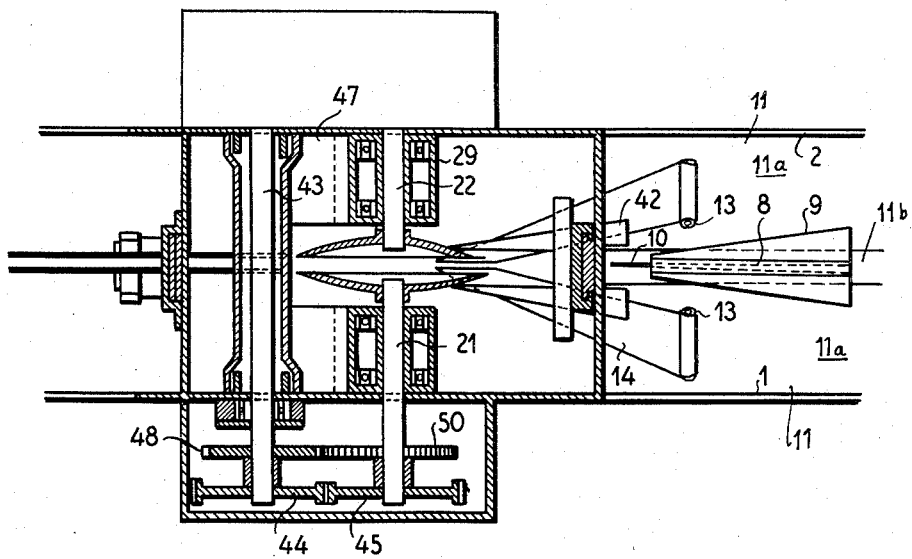
Figure 6:
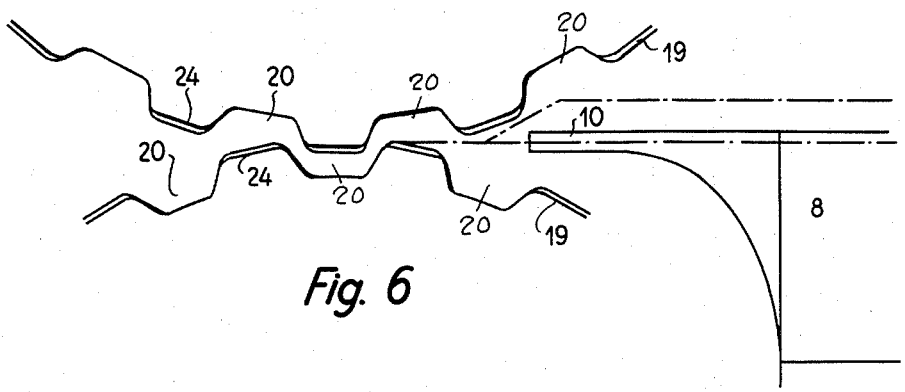
Figures 3, 4, 5:
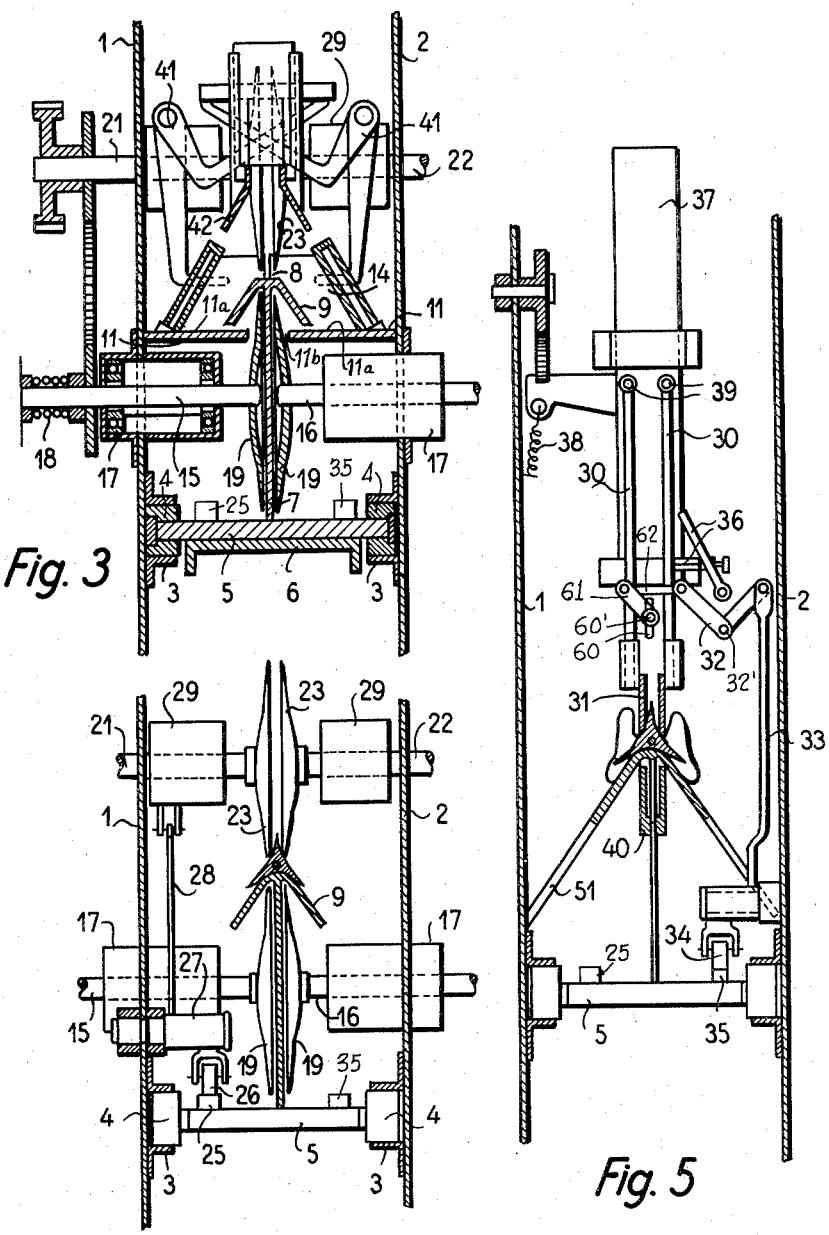

The invention includes further details of construction in a machine for cutting fillets from fish, for attaining the desired effect, as will be apparent from the following detailed description of the machine taken in conjunction with the accompanying drawings, in which Fig. 1 is a longitudinal view, partly in section, of the machine with part of one side wall broken and the driving means shown only in part, Fig. 2 shows in plan elevation and partly in section the propelling means and the lower disc cutters with associated members, Fig. 3 is a vertical transverse section through the machine rearwardly of the cutter members, substantially along line III—III of Fig. 1, Fig. 4 is a view similar to that shown in Fig. 3 but illustrating other details of the construction, substantially along line IV—IV of Fig. 1, Fig. 5 is a vertical transverse section through the machine forwardly of the cutter members, substantially along line V—V of Fig. 1, Fig. 6 shows on an increased scale a fragment of the disc cutters, and Figs. 7 and 8 show two sections of a fish.

The machine consists of two side walls 1 and 2 each provided along its inner side with a groove 3, Figs. 3–5, for rollers 4 mounted on each link 5 of a conveyer chain which, at least with its upper part, rest upon a support 6. To each of a predetermined member of the chain links 5 is attached a vertical flat propelling member 7 serving as carrier for a table for the fish to be treated.

This table consists of a narrow horizontal table top 8 which along each side is provided with a downwardly and outwardly inclined side plate 9 so shaped that the combined table 8, 9 tapers forwardly corresponding substantially to the inner surface of a cleaned cod. In Figs. 7 and 8 is shown in section the shape of such a cleaned cod, Fig. 7 being a section through the foremost part of the cod after removal of its head and entrails, and Fig. 8 a section through the tail end of the cod. Each propelling member has an upper portion formed with a forwardly projecting spike 10 arranged in alignment with the table top 8, see Figs. 1 and 2, and when each propelling member is in the position shown in Figs. 2 and 3, this upper portion projects upwardly through an elongated slot 11b of a support means composed of two longitudinally spaced support plates 11, so that, after placing a cod upon the upper supporting surface 11a of the support means 11, the spike may be inserted into the hollow 12, Fig. 7 at the head-end of the backbone when the propelling member 7 with table 8, 9 and the cod is conveyed through the machine.

On the upper side of the support means 11 the machine is provided with two inclined posts 13 each carrying a resilient guide plate 14 so shaped and arranged relaatively that the propelling member 7 and table 8, 9 may just pass between their lower edges.

In each side wall 1 and 2 is arranged a ball bearing 17 for shafts 15 and 16 respectively. These shafts are arranged in elongation of each other, and each is, by means of a spring 18, Fig. 3, pressed resiliently towards each other but may be pressed apart by means of the propelling member 7 when passing between them. To each shaft 15 and 16 is attached a vertical disc cutter 19 which along its periphery is provided with a number of indentions 20, Fig. 6. The base and sides of these indentions form in combination with the cutter periphery a continuous cutting edge 24. Above the disc cutters 19 there are arranged two similar disc cutters 23 mounted vertically on shafts 21 and 22 respectively which are journalled in displaceable bearings 29.

The two pairs of disc cutters are adjusted in such a manner in relation to each other that the projecting parts of one cutter enter the indentions 20 of the opposed cutter. By this arrangement the cutters are not liable to sever the bones of the fish. After being placed on the support means 11 and engaged by a spike 10 the propelling member moves the fish between the foremost ends of the guide plates 14, and the cutters 19, 23 cut the flesh from the tail-end of the backbone. This position of the cutters in relation to the fish is retained until the fillets at the tail part are cut from the bone, i. e. until the cutters from the cross section of the backbone as shown in Fig. 8 reach the bone cross section shown in Fig. 7.

Each chain link 5 is provided with a lug 25 see Fig. 4 which, when the part of the fish where the back bone cross section changes has reached the cutters 19, 23, abuts a roller 26 mounted on one arm of a bell crank lever 28 rotatable on a fulcrum 27, the other arm being connected to one of the displaceable bearings 29, in which the shaft 21 for cutters 23 is journalled, to the effect that the cutters 23 are raised from the fish. At the same time the table 8, 9, Fig. 3, slides in between the cutters 19.

For cutting off the body part fillets from the backbone which along this part of the body has the cross section shown in Fig. 7, there are provided two swinging arms 30, Fig. 5, to the free ends of which there are attached vertical cutters 31. By means of a link connection 32 these arms are connected to the one arm of a bell crank lever 33, the other arm having mounted thereon a roller 34. When the backbone moves away from the cutters 19, 23, i. e. at the point where the cross section of the backbone changes from that shown in Fig. 8 to that shown in Fig. 7, a lug 35 on the chain link 5 abuts roller 34 and thus causes the bell crank lever 33 to swing in such a manner that the cutters 31 are moved slightly apart. This is accomplished through the intermediary of any suitable linkage arrangement, and the one shown in Fig. 5 includes an elongated wedging member 60 which is arranged between the arms 30 and is pivotal about an axis 60' that extends in the longitudinal direction of the apparatus between the vertical position shown in Fig. 5 and a substantially horizontal position wherein this wedging member, which is somewhat longer than the distance between the arms 30, engages these arms and wedges them apart. Pivoting of the wedging member 60 about its horizontal pivot axis is accomplished by rotating a link 61, one end of which is connected to the wedging member, in clockwise direction (as viewed in Fig. 5). The free end of the link 61 is connected to one end of a draw bar 62, and the opposite end of this draw bar is connected to one free end of a bell-crank link 32 which is pivotable about a horizontal pivot axis 32'. The opposite end of the bell-crank link is connected to the lever 33. Thus, when the roller 34 is engaged by a lug 35, thereby pulling down the lever 33, the bell-crank link 32 is pivoted clockwise about the axis 32', and this, in turn, draws the draw bar 62 rightwardly so as to pivot the link 61, and with it the wedging member 62, clockwise about the pivot axis 60. As a result, the arms 30 are wedged apart and the cutters 31 moved outwardly. The swinging motion of arms 30 will actuate a pawl 36 which up to now has been in engagement with a vertical bar 37 to which the swinging arms 30 are pivotally connected by means of pivot pins 39. When thus actuated the pawl 36 releases rod 37, which is pressed downwards by means of a spring 38 to the effect that the cutters 31 will remove the last part of the fillet from the backbone as indicated in Fig. 5, the fillets being supported by the side plates 9. Arms 30 are arranged for free lateral swinging motions on their pivot pins 39. The cutters 31 may, however, be guided in any other adequate manner.

During the last part of the cutting operation the backbone is guided between two laterally expandable rods 40.

In order to hold the fish firmly on the support means 11 and table 8, 9 during the cutting operations, the guiding plates 14 have attached thereto two angular arms 41 which carry two pressure plates 42. When the fish is moved in between the two guiding plates 14 and press them outwardly, the pressure plates 42 will, through their angular arms 41, be pressed down against the fish.

The rotatable cutters are operated from a main shaft 43, Fig. 1, which at each side of the machine carries a gear wheel 44 meshing with a gear wheel 45 on shaft 21 or 22, and the bearings 29 for these shafts are mounted on arms 47 rotatably attached to the main shaft 43 in such a manner that shafts 21 and 22 can be raised without disengaging the intermeshing gear wheels 44 and 45. Main shaft 43 carries furthermore sprocket wheels 48 which through chains 49 (shown diagrammatically in Fig. 1) are connected to other sprocket wheels 50 on shafts 15 and 16.

As shown in Fig. 5 the guide plates 9 are each provided with an outwardly inclined and downwardly projecting extension leading to a chute 51, along which the cut-away fillets slide over to a device for removing the skin from the fillets, which is not described since it has no direct relation to the present invention.

I declare that what I claim is:
1. A machine for cutting fillets from fish and the like, comprising, in combination, support means having a supporting surface formed with an elongated slot; an endless conveyor chain mounted below said support means for movement relative thereto in the direction of said slot; a plurality of narrow propelling members mounted on said conveyor chain, each having a substantially spear-shaped upper portion extending in said direction, each of said upper portions being adapted to engage the rearwardly turned head end of a previously beheaded fish, at least one of said propelling means extending upwardly from said conveyor chain through said slot of said supporting surface of said support means so that the upper portion of said one propelling member may engage a previously beheaded fish placed upon said supporting surface in the region of said slot thereof and move such fish along a work path extending in said direction of said slot; and cutter means on said support means in the region of said work path and on both sides thereof for cutting each side of a fish carried by said one propelling member, beginning with the tail end, while said one propelling member moves the fish along said work path.

2. A machine as claimed in claim 1, in which the top of each propelling member carries an elongated and narrow plate provided with outwardly and downwardly flared sides the inclination of which increases from the rear to the front end.

3. A machine as claimed in claim 1, in which said cutter means include lower disc cutters, journalled in stationary bearings, and upper disc cutters journalled in vertically displaceable bearings.

4. A machine as claimed in claim 3, in which said lower disc cutters are mounted, respectively, on two aligned shafts longitudinally displaceable in stationary bearings; and spring means for urging said two shafts against each other.

5. A machine as claimed in claim 4, in which said upper disc cutters are mounted, respectively, on two aligned longitudinally displaceable shafts journalled in two vertically displaceable bearings; and means for actuating said vertically displaceable bearings to displacement when said endess chain has moved the fish a predetermined distance.

6. A machine as claimed in claim 5, and guide plates rearwardly of the lower disc cutter pair; link members interposed between said guide plates; and a pair of hold-down plates for the fish.

7. A machine as claimed in claim 5, and power means for the cutter disc, said power means including a main driven shaft, a chain drive between said shaft and each lower disc cutter shaft, a gearing between said main shaft and the shafts of said upper disc cutters, and a connecting arm rotatable on said main shaft and attached to each upper disc cutter shaft.

8. A machine as claimed in claim 5, and two vertical cutters arranged along said work path for removing the fillets from the backbone after the fish has passed said disc cutters; moving means for moving said vertical cutters laterally, said moving means being actuated by the movement of said endless chain.

References Cited in the file of this patent
UNITED STATES PATENTS

| 1,861,863 | Hunt | June 7, 1932 |
| 2,409,463 | Ahrndt | Oct. 15, 1946 |
| 2,431,893 | Savrda | Dec. 2, 1947 |
| 2,550,025 | Savrda | Apr. 24, 1951 |
| 2,680,876 | Oates | June 15, 1954 |